(12) United States Patent
Yang

(10) Patent No.: US 9,274,569 B2
(45) Date of Patent: Mar. 1, 2016

(54) DETACHABLE ASSEMBLY AND MEMORY MODULE USING THE SAME

(71) Applicant: ADATA TECHNOLOGY CO., LTD., New Taipei (TW)

(72) Inventor: Yujen Yang, Taipei (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 72 days.

(21) Appl. No.: 13/862,411

(22) Filed: Apr. 13, 2013

(65) Prior Publication Data

US 2014/0211404 A1    Jul. 31, 2014

(30) Foreign Application Priority Data

Jan. 30, 2013 (TW) .............................. 102103473 A

(51) Int. Cl.
*G06F 1/18* (2006.01)

(52) U.S. Cl.
CPC ...................................... *G06F 1/185* (2013.01)

(58) Field of Classification Search
CPC ............. H05K 9/00; H05K 5/00; H05K 7/20; H05K 7/14
USPC ............ 361/63, 736, 737, 752, 803, 816–818
See application file for complete search history.

(56) References Cited

U.S. PATENT DOCUMENTS

| 5,502,620 | A | * | 3/1996 | Funck | G06K 19/07735 361/737 |
| 5,537,294 | A | * | 7/1996 | Siwinski | H05K 9/0039 235/380 |
| 5,563,450 | A | * | 10/1996 | Bader | H01R 13/6485 257/678 |
| 6,049,468 | A | * | 4/2000 | Learmonth | 361/816 |
| 6,233,150 | B1 | * | 5/2001 | Lin et al. | 361/704 |
| 6,297,966 | B1 | * | 10/2001 | Lee et al. | 361/799 |
| 6,343,020 | B1 | * | 1/2002 | Lin | G11C 5/04 361/753 |
| 7,391,613 | B2 | * | 6/2008 | Lai et al. | 361/700 |
| 7,768,789 | B2 | * | 8/2010 | Ni et al. | 361/737 |
| 8,289,666 | B2 | | 10/2012 | Shin | |
| 2011/0308994 | A1 | | 12/2011 | Lin | |
| 2013/0007356 | A1 | | 1/2013 | Liu et al. | |

FOREIGN PATENT DOCUMENTS

| TW | 458423 | 10/2001 |
| TW | 517376 B | 1/2003 |
| TW | 200824197 | 6/2008 |

* cited by examiner

*Primary Examiner* — Tuan T Dinh
*Assistant Examiner* — Rockshana Chowdhury
(74) *Attorney, Agent, or Firm* — Li & Cai Intellectual Property (USA) Office

(57) ABSTRACT

The instant disclosure relates to a memory module comprising a PCB and a detachable assembly. The PCB has a terminal portion and a free portion away from the terminal portion. The detachable assembly includes a plurality of metal members disposed on the free portion of the PCB. Thereby, user can averagely force the metal members to install or detach the memory module from a memory slot of a computer system to prevent the interference of outer ESD to affect the normal function of PCB.

11 Claims, 6 Drawing Sheets

DETACHABLE ASSEMBLY AND MEMORY MODULE USING THE SAME

BACKGROUND OF THE INVENTION

1. Field of the Invention

The instant disclosure relates to an auxiliary detachable assembly for electronic devices; in particular, to a detachable assembly and the memory module using the same which can prevent electrostatic interference.

2. Description of Related Art

As the volume of electronic devices continues to miniaturize, the processing speed and operational functions are gradually becoming faster and more powerful, respectively. As a result, mainboards and electronic components in electronic devices are not only required to be miniaturized, but are also required to provide even higher operational speed in order to meet users' demand. As the data processing power increases, the demand for higher capacity and speed from memory modules of computers increases.

Dynamic random access memory (DRAM) is presented in the form of a module within a computer. In other words, DRAM module includes integrated circuits and printed circuit boards. Users usually first align the printed circuit board of the DRAM module against the memory slot, then apply a force on the top portions of the DRAM module such that the printed circuit board is inserted into the memory slot, thus, the computer system can operate normally.

However, static electricity tends to store in the hands of users and is transmitted to the DRAM module which can lead to abnormal operations thereof. In severe cases, electronic components may malfunction or even be damaged. Moreover, the surface area on top of the DRAM module in which users can apply force upon is relatively small. Specifically, the force applicable area is substantially the thickness of the printed circuit board. As a result, users are more likely to misalign the DRAM module with the memory slot, thus, affecting normal operations, or even worse, damaging the DRAM module.

To address the above issues, the inventor strives via associated experience and research to present the instant disclosure, which can effectively improve the limitation described above.

SUMMARY OF THE INVENTION

The object of the instant disclosure is to provide a detachable assembly to facilitate installation or detachment of electronic devices and prevent static electricity from transmitting to the electronic devices, which may affect normal operations, during installation or detachment.

In order to achieve the aforementioned objects according to an embodiment of the instant disclosure, a detachable assembly is provided to facilitate installing or detaching a memory module of a printed circuit board in a memory slot. The printed circuit board has a terminal portion and a free portion arranged away from the terminal portion. Notably, the detachable assembly includes a plurality of metal parts which are disposed on the free portion of the printed circuit board.

According to the aforementioned detachable assembly, the instant disclosure also provides a memory module which includes a printed circuit board and a detachable assembly. The printed circuit board has a terminal portion and a free portion arranged away from the terminal portion. The detachable assembly includes a plurality of metal parts which are disposed on the free portion of the printed circuit board.

In an embodiment of the instant disclosure, the metal parts are arranged with a predetermined distance to provide means for even force exertion thereon.

The printed circuit board has a first surface and an oppositely arranged second surface. The first surface and the second surface each has a first corner and a second corner arranged proximate to the terminal portion and has a third corner and a fourth corner arranged away from the terminal portion. The metal parts are respectively disposed on the third corner of the first surface, the fourth corner of the first surface, the third corner of the second surface, and the fourth corner of the second surface.

The terminal portion of the printed circuit board includes a plurality of ground terminals. The first surface and second surface of the printed circuit board have a plurality of metal traces disposed thereon. An end of the metal trace connects to copper foil and the other end connects to the ground terminal.

The metal parts may be a plurality of metal sleeves. The metal sleeves envelop the free portion of the printed circuit board and respectively envelop the third corners of the first, second surfaces and the fourth corners of the first, second surfaces.

The third and fourth corners of the first surface each has a first coupling structure while the third and fourth corners of the second surface each has a second coupling structure. Each of the metal sleeves has a first retaining structure corresponding to the first coupling structure and a second retaining structure corresponding to the second coupling structure.

Each of the metal sleeves has a base wall and an annular side wall connected to the base wall. The first retaining structure and the second retaining structure are respectively arranged on an inner portion of the annular side wall.

In summary, the instant disclosure provides the following features: Through the installation or detachment of the memory module, integrated circuits can obviate damages from static electricity that are stored in users' hands by transmitting the static electricity to the ground terminal via metal parts. As a result, the usable life of the memory module can be extended.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

Embodiment 1

Figure 1:
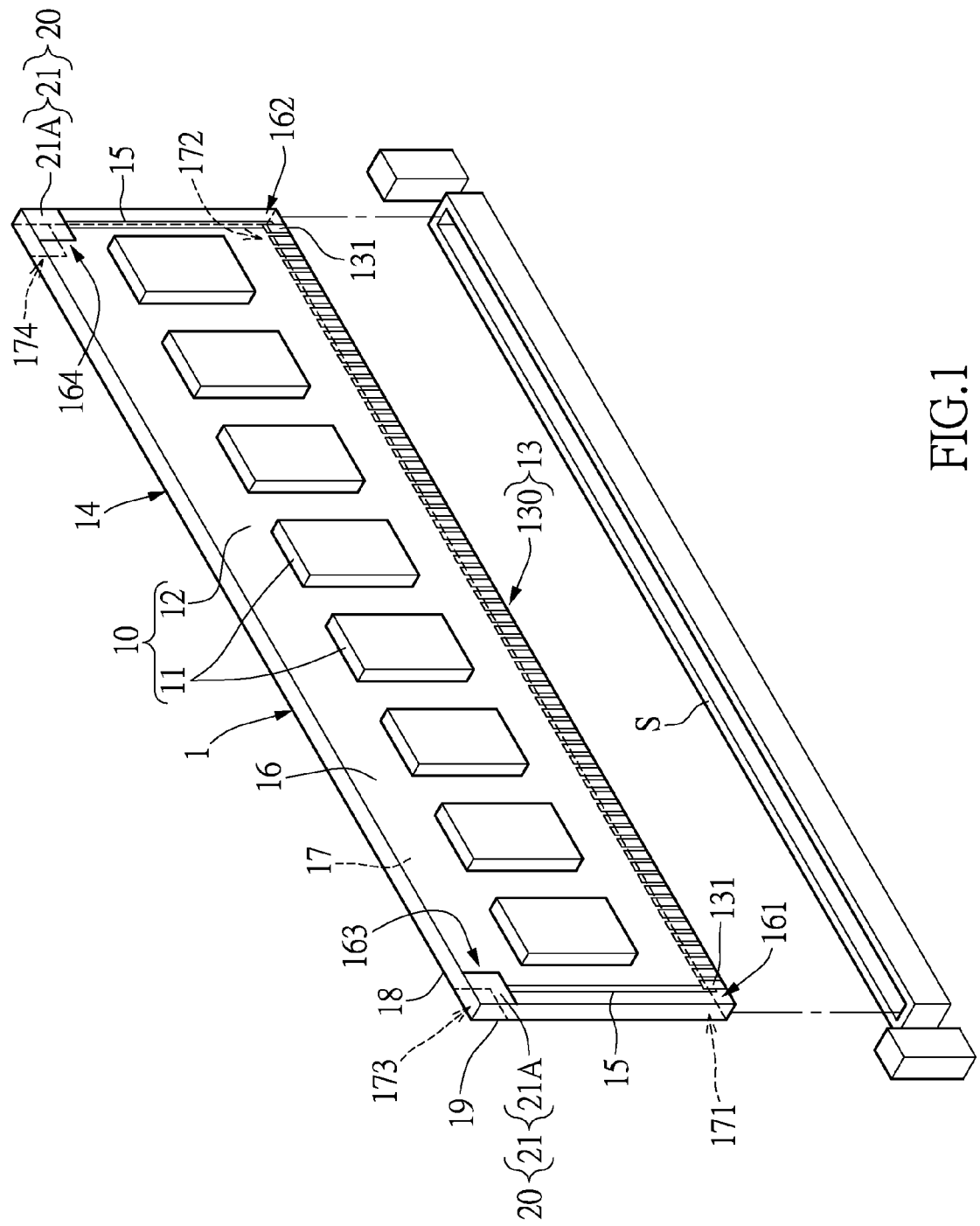
FIG. 1 is a schematic diagram of a memory module according to the first embodiment of the instant disclosure.
Figure 2:
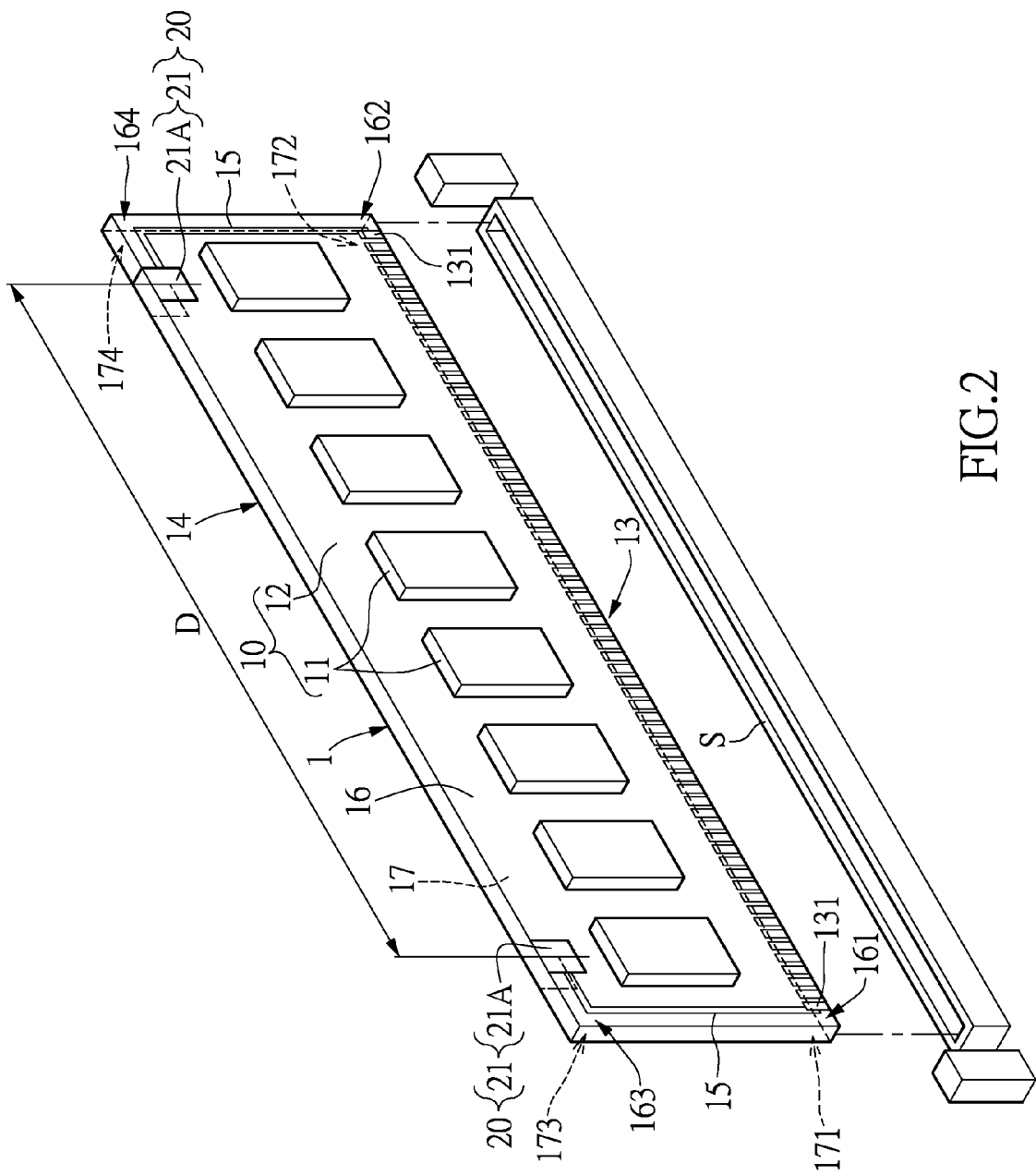
FIG. 2 is a schematic diagram of the memory module illustrating another example of the first embodiment according to the instant disclosure.

Please refer to FIGS. 1 and 2 as the schematic diagrams illustrating a memory module 1 according to the first embodiment of the instant disclosure. The memory module 1 includes a printed circuit board 10 and a detachable assembly 20.

Specifically, the printed circuit board 10 is formed by a plurality of packaged integrated circuits 11 and a module card 12 in which the peripheral portions of the packaged integrated circuits 11 have a plurality of metal pins disposed thereon. A surface of the module card 12 further has metal patterns formed thereon and apertures (not shown in figures) for soldering the metal pins thereon. In addition, the printed circuit board 10 further includes a terminal portion 13 and a free portion 14 arranged away from the terminal portion 13. The terminal portion 13 is defined with a metal contact region 130 thereon for inserting into a memory slot S of a computer motherboard, thus, the memory module 1 can store programs and data into the computer system.

The detachable assembly 20 includes a plurality of metal parts 21 disposed on the free portion 14 of the printed circuit board 10. In the instant embodiment, the metal parts 21 are metal foils 21A (such as copper foil), of which the quantity is set as four, and are disposed in pairs on the free portion 14 of the printed circuit board 10. The metal parts 21 are disposed in pairs on the free portion 14 of the printed circuit board 10. Furthermore, the two pairs of metal foils 21A are arranged with a predetermined distance D therebetween, in which each metal foil 21A has a substantially square shape and an area to facilitate users' fingers to exert force thereon.

Notably, the predetermined distance D is not specifically limited. As long as the users can evenly exert force onto the printed circuit board 10, the distance is the predetermined distance between the two pairs of metal foils 21A. Moreover, the quantity and dimensions of the metal foils 21A are not specifically limited and can be adjusted based on the product specifications.

Furthermore, the metal contact region 130 of the terminal portion 13 includes a plurality of ground terminals 131. The first surface 16 and the second surface 17 of the printed circuit board 10 respectively have a plurality of metal traces 15. An end of the metal trace 15 is coupled to the metal foil 21A and the other end is coupled to the ground terminal 131 for transmitting static electricity from the metal foil 21A to the ground terminal 131 and successively transmitting from the ground terminal 131 to surroundings outside of the computer system.

In further details, the printed circuit board 10 has a first surface 16 and an opposing second surface 17. The first and second surface 16, 17 each has a first corner 161, 171 and a second corner 161, 172 arranged proximate to the terminal portion 13, and a third corner 163, 173 and a fourth corner 164, 174 arranged away from the terminal portion 13. In a more preferable embodiment, the metal foils 21A are respectively disposed on the third corner 163 of the first surface 16, the fourth corner 164 of the first surface 16, the third corner 173 of the second surface 17, and the fourth corner 174 of the second surface 17 (as shown in FIG. 1).

As a result, users can evenly exert force with two hands to ensure the installation and the detachment of the memory module 1 respectively on and from the memory slot S of the computer motherboard. Specifically, during the installation or detachment of the memory module 1, integrated circuits 11 can obviate damages from static electricity that are stored in users' hands by transmitting the static electricity to the ground terminal 131 via metal foils 21A.

In more details, the aforementioned corners are provided with further definitions. The printed circuit board 10 also has two long sides 18 and two relatively short sides 19, in which each long side 18 intersects with two relatively short sides 19, and vice versa. The first corners 161, 171, second corners 162, 172, third corners 163, 173, and the fourth corners 164, 174 are respectively arranged on four intersections of two long sides 18 and two relatively short sides 19. The aforementioned example is a more preferred embodiment of the instant disclosure. The metal foil parts (metal foils) of the instant disclosure can also be configured in pairs and arranged on the first surface 16 and second surface 17 of the printed circuit board 10 relatively proximate to the third corners 163, 173 and the fourth corners 164, 174 of the first and second surfaces 16,17 (as shown in FIG. 2).

Second Embodiment

Figure 3A:
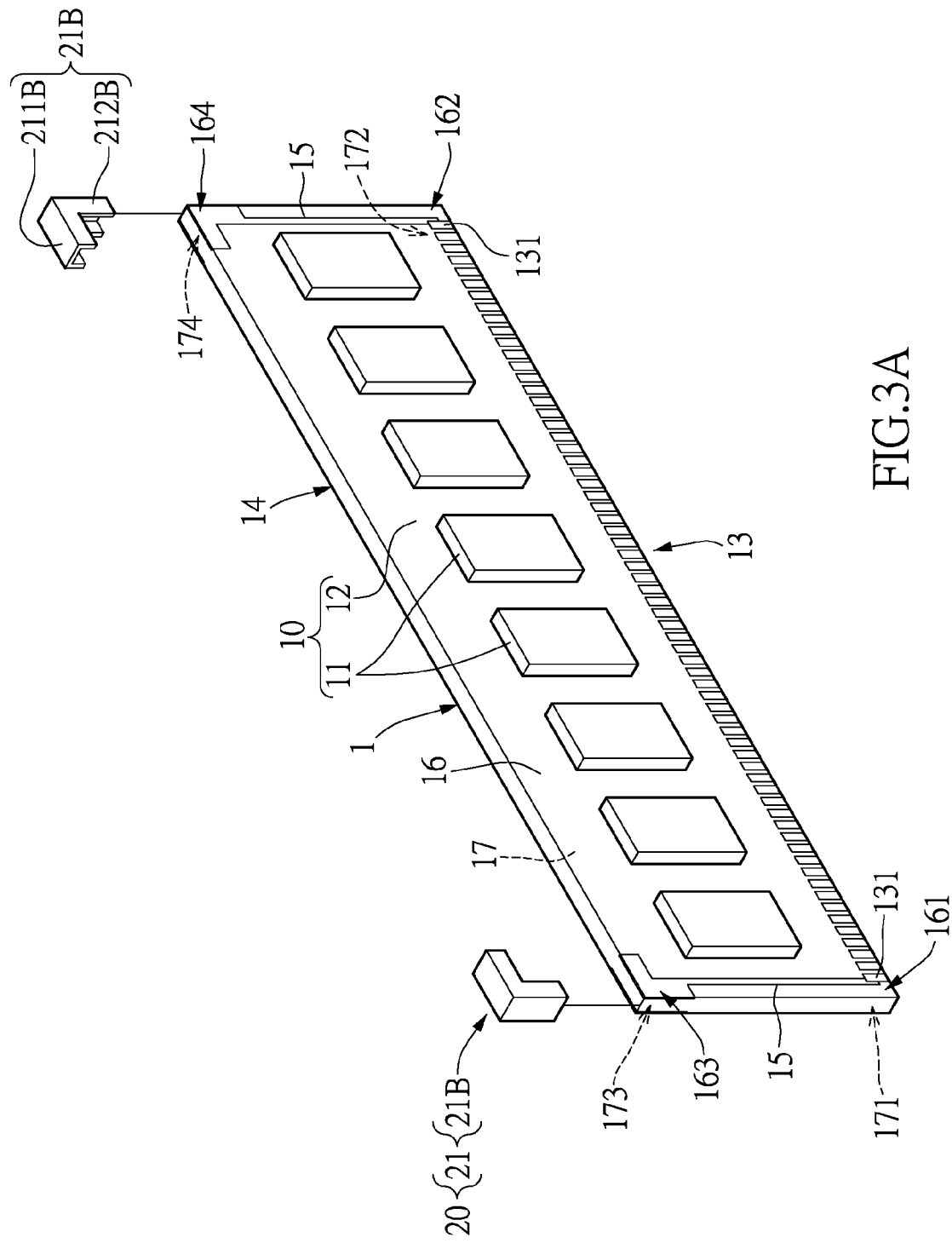
FIG. 3A is an exploded view of the memory module illustrating the second embodiment according to the instant disclosure.
Figure 3B:
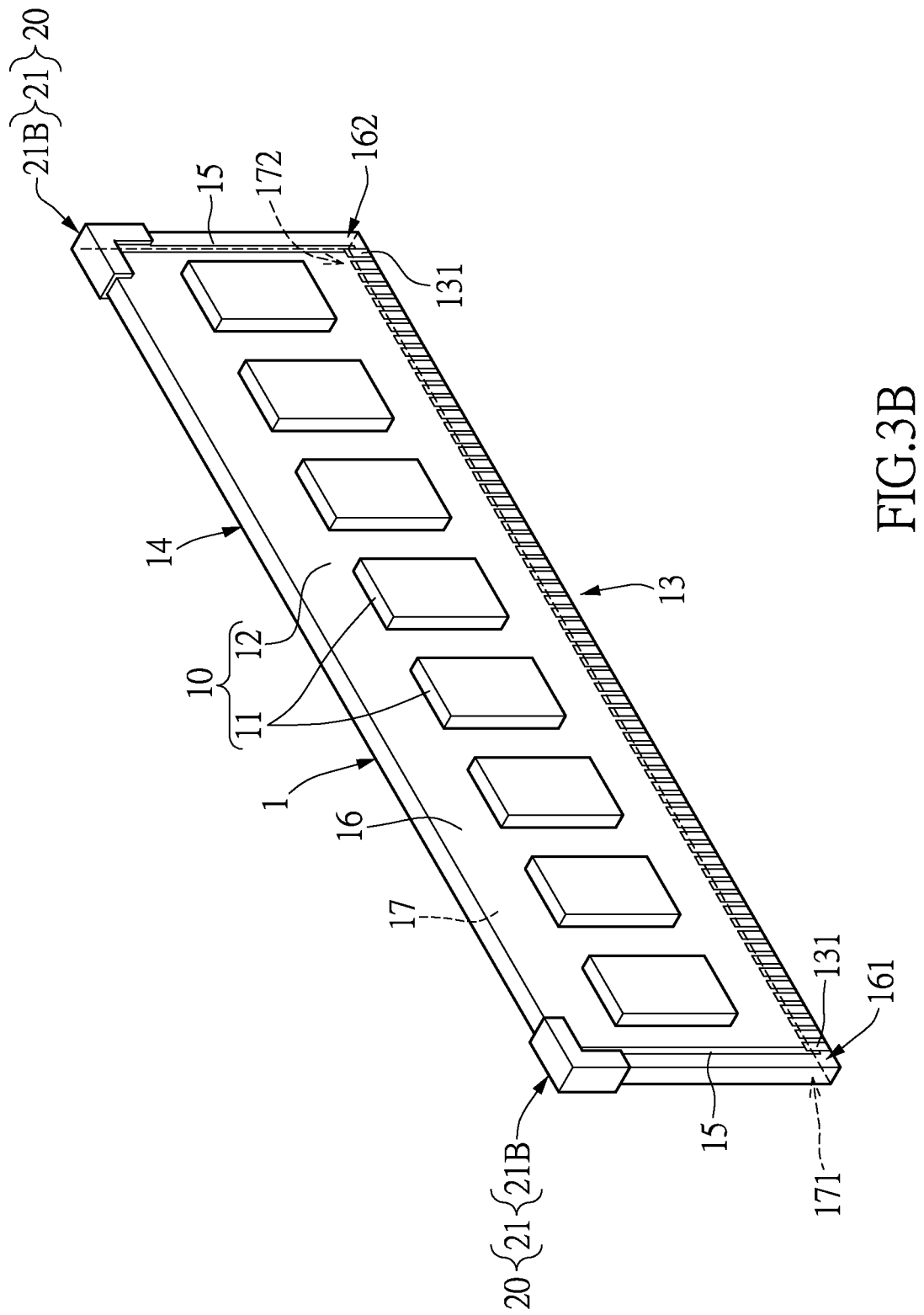
FIG. 3B is an assembled view of the memory module illustrating the second embodiment according to the instant disclosure.

Please refer to FIGS. 3A and 3B as the schematic diagram of the memory module illustrating the second embodiment according to the instant disclosure. The second embodiment differs from the first embodiment in that the metal parts 21 of the instant embodiment is a plurality of metal sleeves 21B and the quantity is set as two.

In particular, the two metal sleeves 21B respectively envelop the free portions 14 of the memory module 1. Specifically, the two metal sleeves 21B respectively envelop the third corners 163, 173 and the fourth corners 164, 174 of the first and second surfaces 16, 17. Each metal sleeve 21B substantially resembles an L shape and the dimensions are not specifically limited. Furthermore, each metal sleeve 21B has a base wall 211B and an annular side wall 212B. The annular side wall 212B has two opposing side surfaces and the two opposing side surfaces are formed with a predetermined distance therebetween. The predetermined distance is slightly smaller than the thickness of the printed circuit board 10 such that the metal sleeves 21B are coupled onto the printed circuit board 10.

Third Embodiment

Figure 4A:
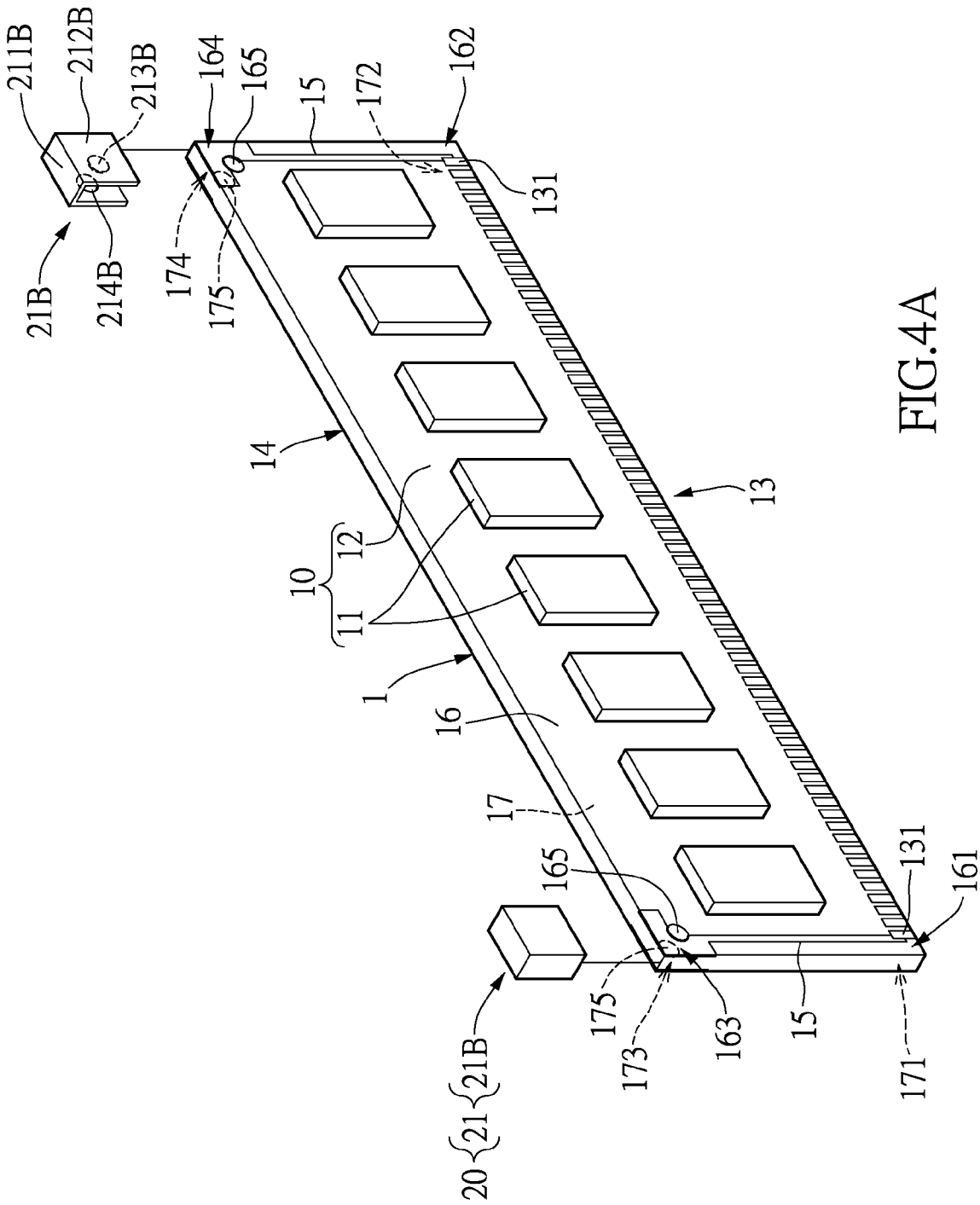
FIG. 4A is an exploded view of the memory module illustrating the third embodiment according to the instant disclosure.
Figure 4B:
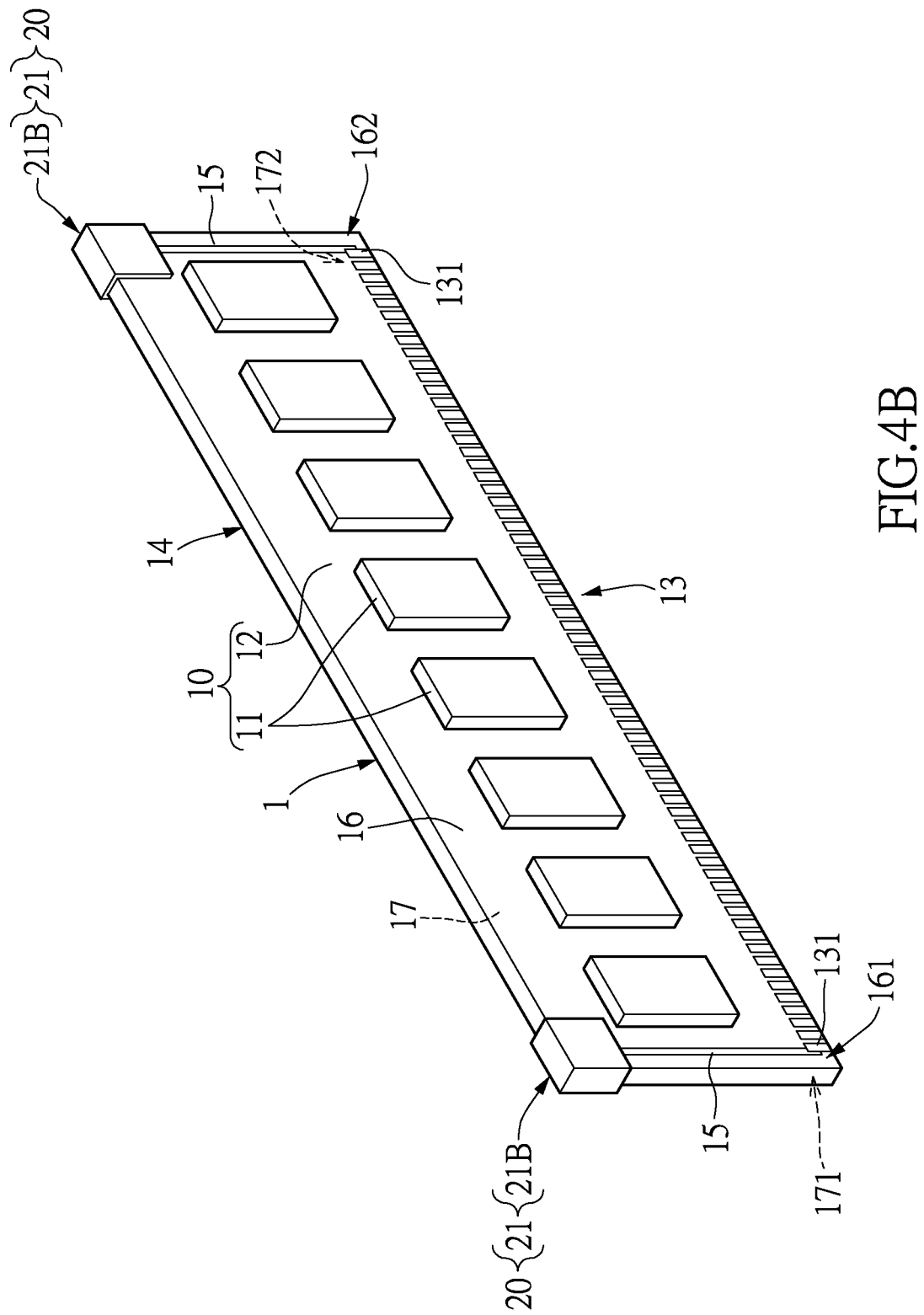
FIG. 4B is an assembled view of the memory module illustrating the third embodiment according to the instant disclosure.

Please refer to FIGS. 4A and 4B as the schematic diagrams of the memory module illustrating the third embodiment according to the instant disclosure. The third embodiment differs from the second embodiment in that the printed circuit board 10 of the instant embodiment has a plurality of first coupling structures 165 and a plurality of second coupling structures 175. In addition, each metal sleeve 21B substantially resembles an L shape and has a first retaining structure 213B and a second retaining structure 214B.

In the instant embodiment, the quantity of the first coupling structure 165 and the second coupling structure 175 is set as two. Two first coupling structures 165 are respectively arranged on the third corner 163 and the fourth corner 164 of the first surface 16 and two second coupling structures 175 are respectively arranged on the third corner 173 and the fourth corner 174 of the second surface 17. Moreover, the first retaining structure 213B and the second retaining structure 214B are respectively arranged on an inner portion of the two opposing side surfaces of the annular side wall 212B. The first retaining structure 213B is mutually coupled with the first coupling structures 165 and the second retaining structure 214B is mutually coupled with the second coupling structures 175.

As an example, the first coupling structures 165 and the second coupling structures 175 can be various shapes of protrusions or coupling structures while the first retaining structure 213B and the second retaining structure 214B can be slots or grooves corresponding to the coupling structures, and vice versa.

In summary, the instant disclosure provides features and functions such as during the installation or detachment of the memory module 1, users can evenly exert force with two hands to ensure the installation and the detachment of the memory module 1 respectively on and from the memory slot S of the computer motherboard. Also, reliability of the electrical connection between the memory module 1 and the computer system can be assured such that the computer system can function normally. Moreover, during the installation or detachment of the memory module 1, integrated circuits 11 can obviate damages from static electricity that are stored in users' hands by transmitting the static electricity to the ground terminal 131 via metal parts 21. As a result, the usable life of the memory module 1 can be extended.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A detachable assembly for installing and detaching a memory module having a printed circuit board in a memory slot, the printed circuit board defining a terminal portion and a free portion arranged opposite the terminal portion, comprising:
a plurality of metal parts disposed on the free portion of the printed circuit board, wherein the terminal portion of the printed circuit board includes a plurality of ground terminals;
wherein metal traces are disposed on a first surface and a second surface of the printed circuit board, and an end of one of the metal traces is directly connected to the metal parts and the other end is directly connected to the ground terminal,
wherein each of the plurality of metal parts is an L-shaped metal sleeve, the L-shaped metal sleeve has an L-shaped accommodating space therein, and the L-shaped accommodating space receives a corner of the free portion of the printed circuit board;
wherein the printed circuit board has a first surface and an oppositely arranged second surface, the first surface and the second surface each has a first corner and a second corner arranged proximate to the terminal portion and have a third corner and a fourth corner arranged away from the terminal portion, the metal parts are respectively disposed on the third corner of the first surface, the fourth corner of the first surface, the third corner of the second surface, and the fourth corner of the second surface;
wherein the metal parts are a plurality of metal sleeves, the metal sleeves envelop the free portion of the printed circuit board and respectively envelop the third corners of the first and second surfaces and the fourth corners of the first and second surfaces.

2. The detachable assembly as recited in claim 1, wherein the metal parts are arranged with a predetermined distance therebetween for exerting even force thereon.

3. The detachable assembly as recited in claim 1, wherein the metal parts are copper foil.

4. The detachable assembly as recited in claim 1, wherein each of the third and fourth corners of the first surface has a first coupling structure, each of the third and fourth corners of the second surface has a second coupling structure, and each of the metal sleeves has a first retaining structure corresponding to the first coupling structure and a second retaining structure corresponding to the second coupling structure.

5. The detachable assembly as recited in claim 4, wherein each of the metal sleeves has a base wall and an annular side wall connected to the base wall, the first retaining structure and the second retaining structure are oppositely arranged on an inner portion of the annular side wall.

6. A memory module, comprising:
a printed circuit board including a terminal portion and a free portion arranged away from the terminal portion; and
a detachable assembly including a plurality of metal parts disposed on the free portion, wherein the terminal portion of the printed circuit board includes a plurality of ground terminals;
wherein metal traces are disposed on a first surface and a second surface of the printed circuit board, and an end of one of the metal traces is directly connected to the metal parts and the other end is directly connected to the ground terminal,
wherein each of the plurality of metal parts is an L-shaped metal sleeve, the L-shaped metal sleeve has an L-shaped accommodating space therein, and the L-shaped accommodating space receives a corner of the free portion of the printed circuit board;
wherein the printed circuit board has a first surface and an oppositely arranged second surface, the first surface and the second surface each has a first corner and a second corner arranged proximate to the terminal portion and have a third corner and a fourth corner arranged away from the terminal portion, the metal parts are respectively disposed on the third corner of the first surface, the fourth corner of the first surface, the third corner of the second surface, and the fourth corner of the second surface;
wherein the metal parts are a plurality of metal sleeves, the metal sleeves envelop the free portion of the printed circuit board and respectively envelop the third corners of the first and second surfaces and the fourth corners of the first and second surfaces.

7. The memory module as recited in claim 6, wherein the metal parts are arranged with a predetermined distance therebetween for exerting even force thereon.

8. The memory module as recited in claim 6, wherein the metal parts are copper foil.

9. The memory module as recited in claim 6, wherein each of the third and fourth corners of the first surface has a first coupling structure, each of the third and fourth corners of the second surface has a second coupling structure, and each of the metal sleeves has a first retaining structure corresponding to the first coupling structure and a second retaining structure corresponding to the second coupling structure.

10. The memory module as recited in claim 9, wherein each of the metal sleeves has a base wall and an annular side wall connected to the base wall, the first retaining structure and the second retaining structure are oppositely arranged on an inner portion of the annular side wall.

11. A memory module, comprising:
a printed circuit board including a terminal portion and a free portion arranged away from the terminal portion; and a detachable assembly including a plurality of metal parts disposed on the free portion, wherein each of the metal parts is a metal sleeve comprising a space therein, and shape of the space matches shape of one corner of the printed circuit board, wherein each of the plurality of metal parts is an L-shaped metal sleeve, the L-shaped metal sleeve has an L-shaped accommodating space therein, and the L-shaped accommodating space receives a corner of the free portion of the printed circuit board;

wherein the printed circuit board has a first surface and an oppositely arranged second surface, the first surface and the second surface each has a first corner and a second corner arranged proximate to the terminal portion and have a third corner and a fourth corner arranged away from the terminal portion, the metal parts are respectively disposed on the third corner of the first surface, the fourth corner of the first surface, the third corner of the second surface, and the fourth corner of the second surface;

wherein the metal parts are a plurality of metal sleeves, the metal sleeves envelop the free portion of the printed circuit board and respectively envelop the third corners of the first and second surfaces and the fourth corners of the first and second surfaces.

* * * * *